United States Patent [19]

Brown

[11] 4,013,154
[45] Mar. 22, 1977

[54] MOUNTING NUT RETENTION FOR FLUID COUPLINGS

[75] Inventor: Richard J. Brown, Marshall, Mich.

[73] Assignee: Eaton Corporation, Cleveland, Ohio

[22] Filed: Nov. 6, 1975

[21] Appl. No.: 629,426

[52] U.S. Cl. .............................. 192/58 B; 85/32.1; 403/259; 403/342; 403/349

[51] Int. Cl.² ...................... F16D 35/00; F16B 7/18

[58] Field of Search ............ 85/32.1; 403/348, 349, 403/342, 259, 261; 192/58 B

[56] References Cited

UNITED STATES PATENTS

| | | | |
|---|---|---|---|
| 13,112 | 6/1855 | Waterhouse | 403/348 X |
| 887,864 | 5/1908 | Steese | 85/32.1 |
| 1,590,022 | 6/1926 | Grosser et al. | 403/342 |
| 2,294,637 | 9/1942 | Thomsen | 85/32.1 UX |
| 2,393,413 | 1/1946 | Rober | 403/342 X |
| 3,263,783 | 8/1966 | Sutaruk | 192/58 B |
| 3,575,269 | 4/1971 | Sherman | 192/58 B |
| 3,736,011 | 5/1973 | Ward | 403/342 X |

*Primary Examiner*—Allan D. Herrmann
*Attorney, Agent, or Firm*—Teagno & Toddy

[57] ABSTRACT

A mounting nut for a viscous fluid coupling. The nut is axially movable upon the input shaft of the coupling into engagement with a contact surface on the flange of the input shaft. Threads are provided on the nut for engagement with threads on a flange secured to the mounting shaft. The flange on the input shaft and the flange on the mounting shaft each have a flat surface perpendicular to the axis of rotation of the coupling. When the nut is threaded onto the flange on the mounting shaft the two flat surfaces are drawn together and forced into tight mating engagement. A key may be provided between the two flanges to ensure 1:1 rotation between the coupling and the mounting shaft.

5 Claims, 3 Drawing Figures

MOUNTING NUT RETENTION FOR FLUID COUPLINGS

FIELD OF THE INVENTION

Viscous fluid couplings have found particular utility in driving fans used to cool a radiator of a liquid cooled engine. The couplings reduce fan noise and increase engine efficiency.

DESCRIPTION OF THE PRIOR ART

Heretofore several methods of attaching the couplings to the water pump shaft have been proposed. These methods generally make use of a number of bolts projecting through a flange on the water pump mounting shaft and a flange on the input shaft of the coupling. In order to ensure placement of the bolts in the openings within the flanges adequate clearance must be provided. In some applications it is desirable to reduce this clearance to a minimum.

Another method of attaching the couplings is proposed in U.S. Pat. No. 3,263,783. This method makes use of a threaded connection directly between the flange on the coupling and the flange on the mounting shaft. The method, however, requires both clearance for attachment and precision machining of the threads to ensure proper alignment of the coupling relative to its rotational axis. Alignment of the coupling relative to its rotational axis is critical in order to ensure proper life of the coupling.

SUMMARY OF THE INVENTION

It is accordingly an object of the present invention to provide an improved, low cost retention means for securing a fluid coupling to a shaft that will require a minimal amount of space and proper alignment of the coupling relative to its rotational axis.

According to a feature of the invention the above object is accomplished by providing an annular mounting nut on the input shaft of the coupling which has a surface engageable with a flange on the input shaft and threads for threaded engagement with threads on a flange secured to a mounting shaft to draw the coupling toward the mounting shaft and properly align the coupling relative to its rotational axis by moving two flat surfaces used for locationing purposes and respectively located on the input shaft and the mounting shaft into tight engagement with one another.

DETAILED DESCRIPTION OF DRAWINGS

Figure 1:
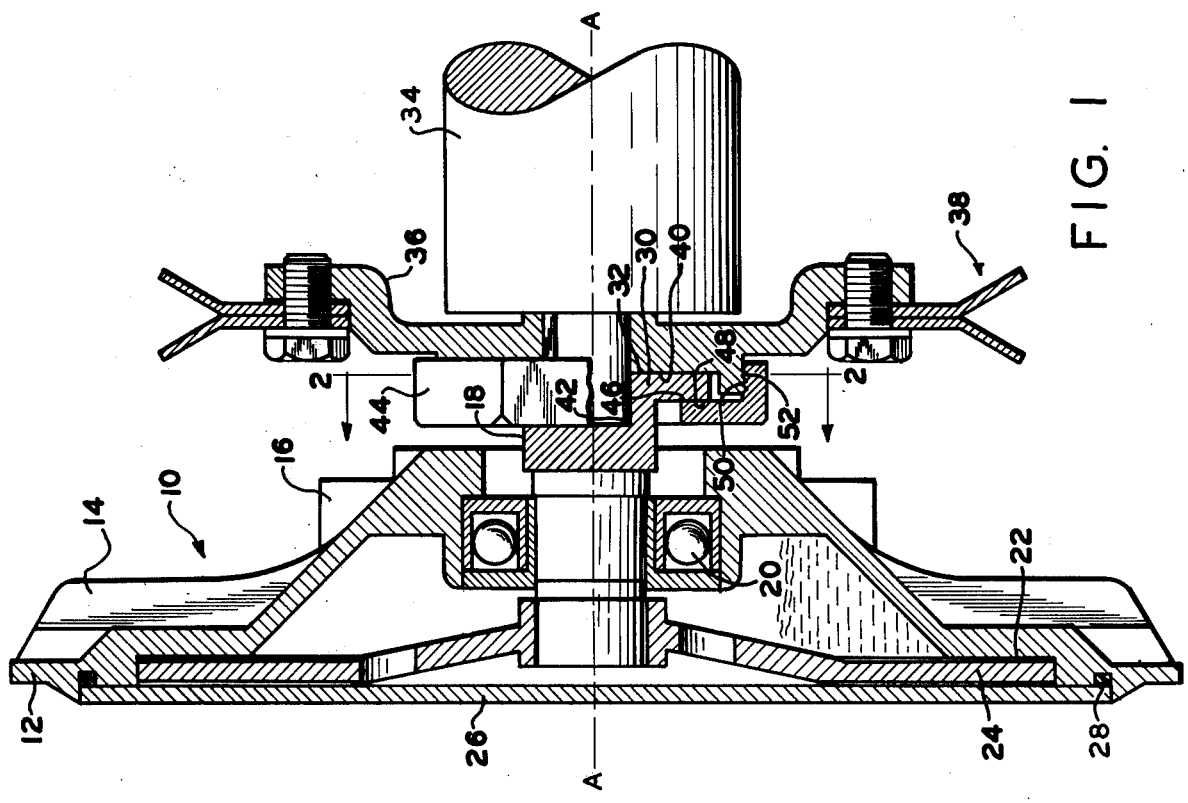
FIG. 1 is a side elevational view partially in section of a fluid coupling illustrating one embodiment of the invention.

FIG. 1 illustrates a viscous fluid coupling 10 which includes a circular output housing 12 having cooling fins 14. Mounting pads 16 for a fan (not shown) are provided on housing 12. A shaft 18 supported by a bearing 20 is mounted in output housing 12 and extends into a cavity 22 in the output housing where it supports a rotor 24. Rotor 24 is rigidly attached to shaft 18. A cover 26 on output housing 12 is crimped in place and a O ring 28 is used therebetween to form a seal to retain viscous fluid in cavity 22. At the rearward end of shaft 18 is a flange 30 having a radially extending flat surface 32 constructed to be perpendicular to axis A—A of coupling 10.

Coupling 10 is generally used for connection with a shaft 34 which drives a water pump of a liquid cooled engine (not shown). A flange 36 encircles shaft 34 and is connected thereto. A pulley 38 which is driven via a belt by a shaft of the engine is mounted on flange 36. Flange 36 includes a radially extending flat surface 40 which is perpendicular to axis A—A of coupling 10. Flange 30 on shaft 18 includes a pilot opening 42 for receiving shaft 34.

An annular mounting nut 44 loosely encircles shaft 18 and has a surface 46 for engagement with a surface 48 on flange 30. An annular inner portion 50 of nut 44 is threaded for mating engagement with threads 52 on a shoulder of a flange 36. Nut 44 and flange 36 are threaded in a direction in opposition to coupling rotation in order that the nut will not loosen during rotation.

To assemble coupling 10 on flange 36, the coupling is located with shaft 34 in opening 42 and the two surfaces 32 and 40 in mating engagement. Nut 44 is thereafter threaded onto flange 36 and tightened in order to draw the surfaces 32 and 40 into tight mating engagement. A hexagonal head is provided on the exterior of nut 44 for the purpose of tightening the nut. Although coupling 10 is illustrated as being held relative to flange 36 by frictional engagement of surfaces 32 and 40 it is contemplated that a key or the like could be provided to ensure 1:1 movement between the flanges 30 and 36.

Figure 2:
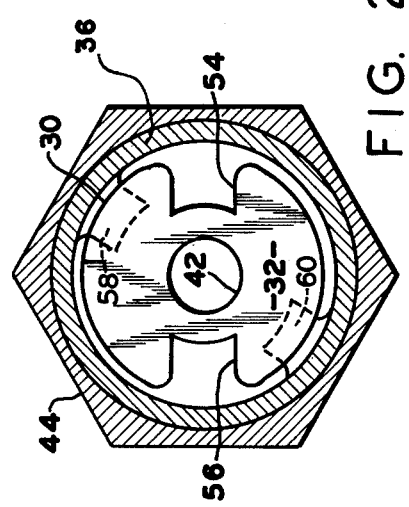
FIG. 2 is a sectional view taken on Line 2—2 of FIG. 1 and illustrating another embodiment of the invention.
Figure 3:
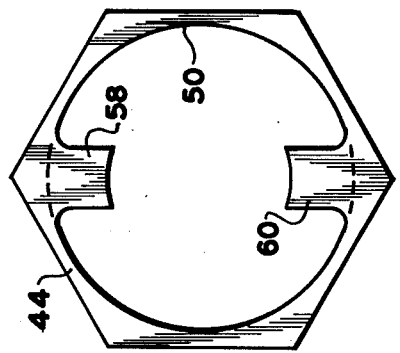
FIG. 3 is an end view of a mounting nut illustrating the embodiment of FIG. 2.

As better illustrated in FIGS. 2 and 3, flange 30 of coupling 10 may have two slots 54 and 56. Nut 44 may also be provided with a couple of tabs 58 and 60 which fit into slots 54 and 56. In this arrangement the lead of the threads in the nut and flange 36 is increased to ensure substantial axial movement during threaded engagement with slight changes in angular displacement of the nut relative to the flange. During assembly, the nut can be turned in order to ensure proper alignment of the clutch relative to shaft 34. The coupling will be thereafter adjusted in place with tabs 58 and 60 of nut 44 slightly offset from slots 54 and 56. The last 90° or so of angular rotation of the nut then occurs in order to tightly lock the nut and flange 36 together and hold coupling 10 in tight engagement wth flange 36. If desired surface 48 on flange 30 can be modified to include a slight ramp arrangement with appropriate modifications in mounting nut 44.

The significance of the disclosed design is to ensure proper axial and radial location of coupling 10 relative to its rotation axis A—A. This is ensured by the perpendicularity of surfaces 32 and 40 relative to axis A—A and the fit of shaft 34 within opening 42. The threaded engagement between mounting nut 44 and flange 36 is for attaching purposes but does not enter into alignment of the coupling relative to axis A—A. Therefore, misalignment of the threads relative to axis A—A during manufacture has no effect on proper alignment of the coupling during assembly.

Further, the given arrangement provides a means to make an extremely short shaft 18 on coupling 10 with a simple and inexpensive method of attachment.

I claim:

1. A mounting for connecting a viscous fan coupling with a mounting shaft that is rotatable about an axis, the coupling having a housing member defining a reservoir containing fluid, a rotor member located within the reservoir and operative with the fluid to rotate with the housing member about an axis, an input shaft having an axis coaxial with the axis of the members and secured to one of the members to rotate the one member, and the other member being adapted to support a fan, the mounting comprising:
  A. a radially extending surface on the mounting shaft perpendicular to the axis of the mounting shaft;
  B. at least one annular thread on the mounting shaft substantially concentric with the axis of the mounting shaft;
  C. a flange on the input shaft extending radially outwardly from the axis of the input shaft;
  D. a contact surface on the side of the flange closest to the one member;
  E. a radially extending surface on the side of the flange opposite from the contact surface, perpendicular to the axis of the input shaft, and adapted to be matingly engaged with the radially extending surface on the mounting shaft;
  F. an annular nut loosely encircling the input shaft, the nut having a surface adapted to engage the contact surface; and
  G. at least one annular thread on the nut substantially concentric with the axis of the input shaft and threadedly engageable with the thread on the mounting shaft to move the mounting shaft toward the flange and force the perpendicular radially extending surfaces into tight frictional mating engagement with one another whereby torque may be transferred from the mounting shaft to the input shaft during rotation of the mounting shaft.

2. A mounting according to claim 1 wherein:
  H. the threads on the mounting shaft are external threads; and
  I. the threads on the nut are internal threads.

3. A mounting according to claim 1 wherein the nut is axially movable on the input shaft.

4. A mounting according to claim 1 wherein:
  H. the flange has a pair of slots; and
  I. the nut has a pair of tabs insertable within the slots.

5. A mounting according to claim 1 wherein:
  H. an opening is provided in one of the shafts and is axially centered relative to the axis of the one shaft; and
  I. the other shaft is configured to have a portion concentric with the axis of the other shaft to fit within the opening in the one shaft and to contact the walls defining the opening in the one shaft to align the axis of the one shaft with the axis of the other shaft.

* * * * *